United States Patent
Yoon et al.

(10) Patent No.: US 12,299,453 B2
(45) Date of Patent: May 13, 2025

(54) SYSTEM ON CHIP AND METHOD FOR OPERATING SYSTEM ON CHIP

(71) Applicant: Samsung Electronics Co., Ltd., Suwon-si (KR)

(72) Inventors: Seok Ju Yoon, Yongin-si (KR); Eun Ok Jo, Suwon-si (KR); Jae Joon Yoo, Incheon (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 365 days.

(21) Appl. No.: 17/699,451

(22) Filed: Mar. 21, 2022

(65) Prior Publication Data
US 2023/0021873 A1 Jan. 26, 2023

(30) Foreign Application Priority Data
Jul. 20, 2021 (KR) .................. 10-2021-0094772

(51) Int. Cl.
| | | |
|---|---|---|
| G06F 9/54 | (2006.01) | |
| G06F 9/38 | (2018.01) | |
| G06F 13/16 | (2006.01) | |

(52) U.S. Cl.
CPC ............ G06F 9/3877 (2013.01); G06F 9/544 (2013.01); G06F 9/546 (2013.01); G06F 13/1673 (2013.01); G06F 2213/0038 (2013.01)

(58) Field of Classification Search
None
See application file for complete search history.

(56) References Cited

U.S. PATENT DOCUMENTS

| | | | |
|---|---|---|---|
| 6,172,971 B1* | 1/2001 | Kim ..................... | H04J 3/1694 370/444 |
| 6,184,906 B1* | 2/2001 | Wang .................. | G06F 13/1615 711/158 |
| 6,240,083 B1* | 5/2001 | Wright ................. | H04W 74/02 370/348 |
| 6,788,697 B1 | 9/2004 | Aweya et al. | |
| 7,760,644 B2 | 7/2010 | Bader | |
| 7,860,053 B1* | 12/2010 | Ho ..................... | H04W 74/0875 370/335 |
| 9,128,625 B1 | 9/2015 | Ananthabhotla | |
| 10,037,275 B2 | 7/2018 | Liu et al. | |
| 10,545,871 B2* | 1/2020 | Birke .................. | G06F 11/3433 |
| 2003/0200315 A1* | 10/2003 | Goldenberg ............ | H04L 47/43 709/225 |
| 2013/0295978 A1* | 11/2013 | Ruohonen ............. | H04W 72/04 455/509 |

FOREIGN PATENT DOCUMENTS

JP     2000-151692 A     5/2000

* cited by examiner

*Primary Examiner* — Michael Sun
(74) *Attorney, Agent, or Firm* — Harness, Dickey & Pierce, P.L.C.

(57) ABSTRACT

A system on chip and a method for operating a system on chip are provided. The system on chip a plurality of intellectual property (IP) cores including a first IP core configured to process data in real-time, a buffer including a plurality of queues, and processing circuitry configured to, generate first traffic data corresponding to first data output from the first IP core, and reserve at least one queue of the plurality of queues as a first dedicated area based on the first traffic data, the first dedicated area configured to be used as a queue for transmission of the first data.

20 Claims, 15 Drawing Sheets

RT_DATA $$\text{Throughput(DATA\_AC)} = N\_RT * \frac{\text{Data\_size(1Q)}}{\text{Latency(DATA\_AC)}} > RT\_BW$$

$$N\_RT \leq N$$

| Index | Event(N_RT) | Reservation Queue | Size |
|---|---|---|---|
| 1 | 1 | Q_N | Q(predetermined) |
| 2 | 2 | Q_N-1-Q_N | Q(predetermined) |
| ... | ... | ... | ... |
| N | N | Q1-Q_N | Q(predetermined) |

N_RT=2,Non-Residual queue

RT_DATA'

N_RT'=N-2

SYSTEM ON CHIP AND METHOD FOR OPERATING SYSTEM ON CHIP

CROSS-REFERENCE TO RELATED APPLICATION

This application claims the benefit of priority under 35 U.S.C. 119 from Korean Patent Application No. 10-2021-0094772 filed on Jul. 20, 2021, in the Korean Intellectual Property Office, the entire contents of which are herein incorporated by reference.

BACKGROUND

Various example embodiments of the inventive concepts relate to a system on chip (SoC), a system including the SoC, and/or a method for operating the SoC, etc.

In a mobile environment, an application processor (AP) is widely used in a mobile device, such as a smart phone and/or a tablet device, etc. The application processor may be implemented in the form of a system on chip (SoC). The system on chip refers to a computer and/or an electronic system component integrated into one integrated circuit, and is generally used mainly in an embedded system field.

Competition in terms of high performance, diversification of functions, and size reduction of the mobile device is intensifying. In this trend, many intellectual properties (IP) (e.g., semiconductor IPs, IP blocks, IP cores, etc.) are included in the application processor.

As the types and the number of intellectual properties increase, a scenario for an operation of the application processor also becomes more complicated, and an expected output value based on each scenario for each intellectual property is fixedly set to be high. Thus, data processing stability of the intellectual property requiring real-time data processing is problematic, and overall performance in data traffic of the application processor is reduced.

SUMMARY

Various example embodiments of the inventive concepts provide a system on chip in which an area dedicated to a real-time master intellectual property (IP) (e.g., an IP block, an IP core, etc.) is reserved in a buffer, dynamically based on a traffic of a real-time master intellectual property, thereby increasing the stability, reliability, and/or efficiency of data processing thereof.

Various example embodiments of the inventive concepts provide a system on chip in which data traffic of a non-real-time master intellectual property is controlled based on a residual queue in the buffer, thereby improving overall performance of data traffic, etc.

However, various aspects of the example embodiments of the inventive concepts are not limited to the above-mentioned purpose. Other purposes and advantages according to the inventive concepts that are not mentioned may be understood based on following descriptions, and may be more clearly understood based on one or more example embodiments according to the inventive concepts. Further, it will be easily understood that the purposes and advantages according to one or more of the example embodiments of the inventive concepts may be realized using means shown in the claims and combinations thereof.

According to an aspect of at least one example embodiment of the inventive concepts, there is provided a system on chip, including a plurality of intellectual property (IP) cores including a first IP core configured to process data in real-time, a buffer including a plurality of queues, and processing circuitry configured to, generate first traffic data corresponding to first data output from the first IP core, and reserve at least one queue of the plurality of queues as a first dedicated area based on the first traffic data, the first dedicated area configured to be used as a queue for transmission of the first data.

According to another aspect of at least one example embodiment of the inventive concepts, there is provided a system on chip, a plurality of intellectual property (IP) cores, the plurality of IP cores including a first IP core and a second IP core, a buffer including a plurality of queues, and processing circuitry configured to, generate first traffic data corresponding to first data output from the first IP core, monitor second data output from the second IP core, in response to a residue queue being absent from the plurality of queues, the residue queue being a queue which is inactive, the processing circuitry is further configured to block transmission of second data by the second IP core, and continue transmission of the first data.

According to another aspect of at least one example embodiment of the inventive concepts, there is provided a method for operating a system on chip, including monitoring transmission of first data output from a first intellectual property (IP) core, wherein the first IP core is configured to process data in real-time, generating first traffic data corresponding to the transmission of the first data, based on the monitoring of the first data, and reserving at least one queue of a plurality of queues in a buffer as a first dedicated area based on the first traffic data, the first dedicated area configured to be used for transmission of the first data.

Other features and example embodiments may be apparent from the following detailed description, the drawings and the claims.

BRIEF DESCRIPTION OF DRAWINGS

The above and other aspects and features of various example embodiments of the inventive concepts will become more apparent by describing in detail example embodiments thereof with reference to the attached drawings, in which:

FIG. 6 to FIG. 11 are diagrams for illustrating a method for operating a system on chip according to some example embodiments of the inventive concepts;

DETAILED DESCRIPTION

Figure 1:
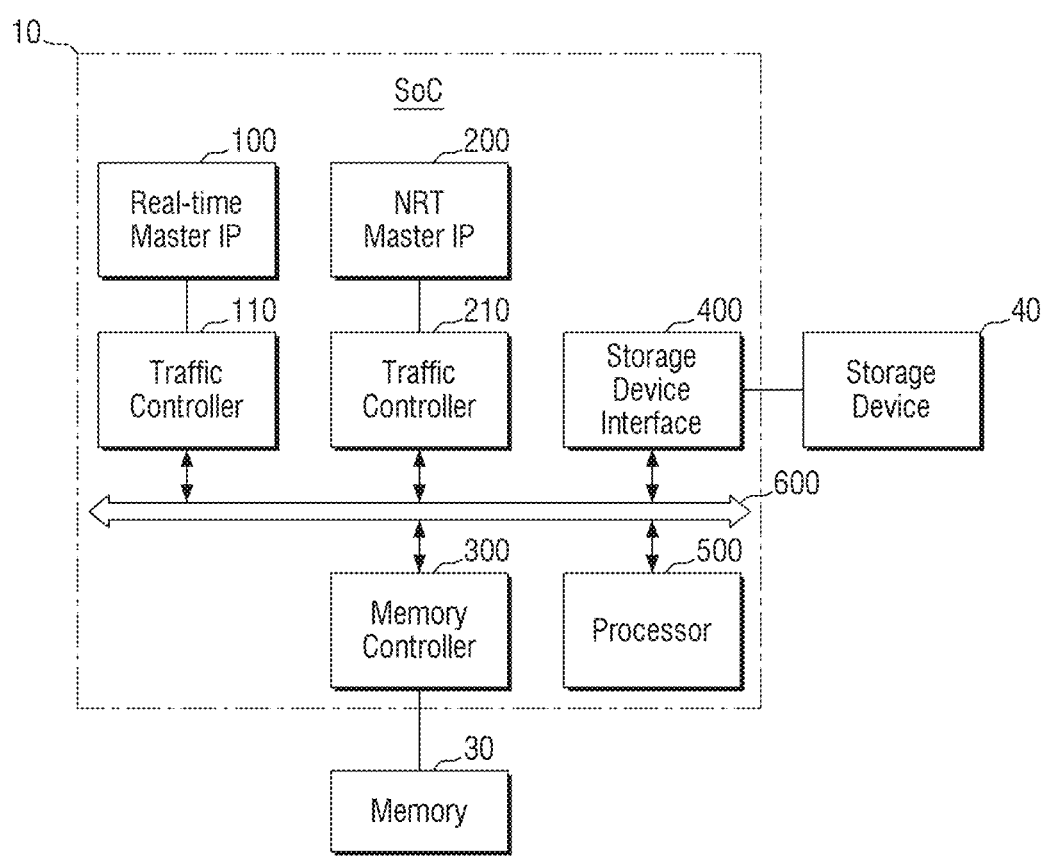
FIG. 1 is a block diagram for illustrating an electronic device including a system on chip according to some example embodiments of the inventive concepts.

For the sake of simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the example embodiments of the inventive concepts, numerous specific details are set forth in order to provide a thorough understanding of the inventive concepts. However, it will be understood that the example embodiments of the inventive concepts may be practiced without these specific details. In other instances, well-known methods, procedures, components, and circuits have not been described in detail so as not to unnecessarily obscure aspects of the inventive concepts. Examples of various example embodiments are illustrated and described further below. It will be understood that the description herein is not intended to limit the claims to the specific example embodiments described. On the contrary, it is intended to cover alternatives, modifications, and equivalents as may be included within the spirit and scope of the example embodiments of the inventive concepts as defined by the appended claims.

A shape, a size, a ratio, an angle, a number, etc. disclosed in the drawings for describing at least one example embodiment of the inventive concepts are examples, and the example embodiments of the inventive concepts are not limited thereto. The same reference numerals refer to the same elements herein. Further, descriptions and details of well-known steps and elements are omitted for simplicity of the description. Furthermore, in the following detailed description of various example embodiments of the inventive concepts, numerous specific details are set forth in order to provide a thorough understanding of the example embodiments of the inventive concepts. However, it will be understood that the example embodiments of the inventive concepts may be practiced without these specific details. In other instances, well-known methods, procedures, components, and circuits have not been described in detail so as not to unnecessarily obscure aspects of the example embodiments.

The terminology used herein is for the purpose of describing particular example embodiments only and is not intended to limit the example embodiments of the inventive concepts. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of at least one of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the inventive concepts.

Unless otherwise defined, all terms including technical and scientific terms used herein have the same meaning as commonly understood by one of ordinary skill in the art to which the inventive concepts belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain example embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated. The features of the various example embodiments of the inventive concepts may be partially or entirely combined with each other, and may be technically associated with each other or operate with each other. The example embodiments may be implemented independently of each other and may be implemented together in an association relationship.

Hereinafter, various example embodiments according to the technical idea of the inventive concepts will be described with reference to the accompanying drawings. In descriptions of FIG. 1 to FIG. 15, the same reference numerals are allocated to substantially the same components, and duplicate descriptions of the components are omitted. Further, throughout the various drawings of some example embodiments of the inventive concepts, like reference numerals are allocated to like elements.

Figure 2:
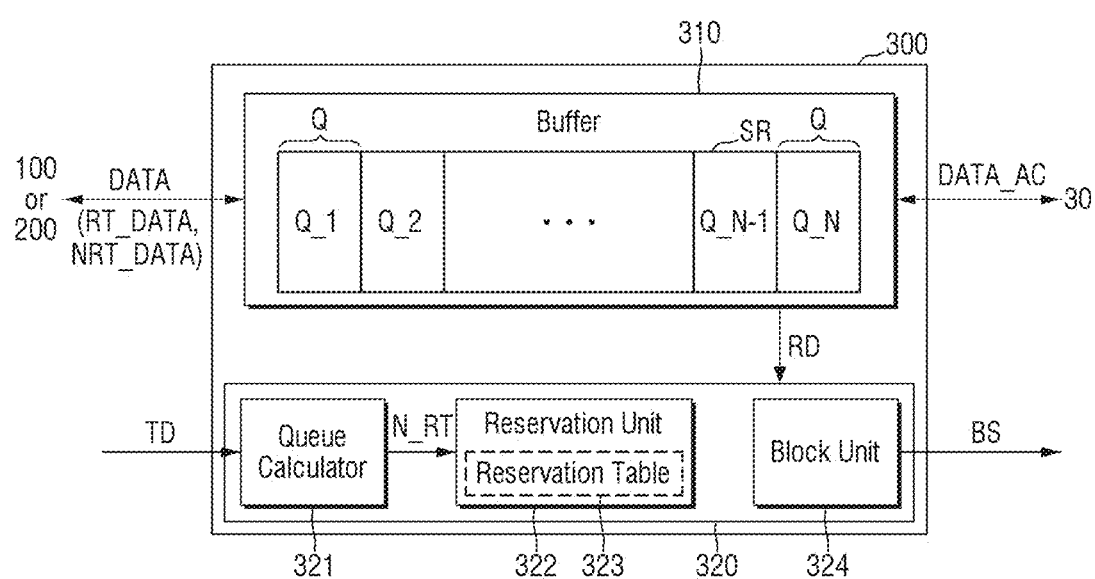
FIG. 2 is a diagram for illustrating a memory controller according to some example embodiments of the inventive concepts.
Figure 3:
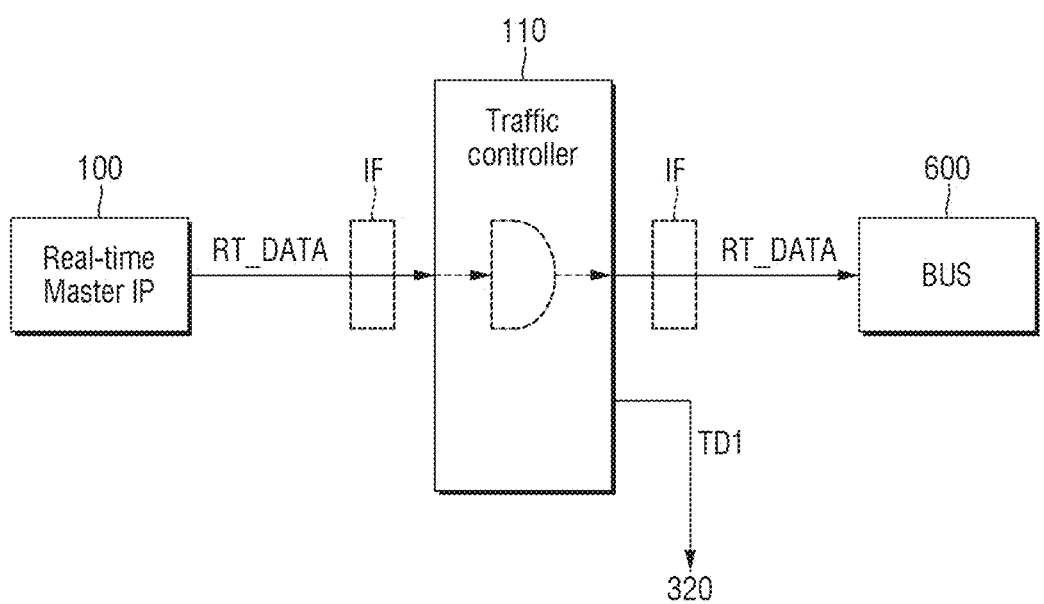
FIG. 3 and FIG. 4 are diagrams for illustrating a traffic controller according to some example embodiments of the inventive concepts.
Figure 4:
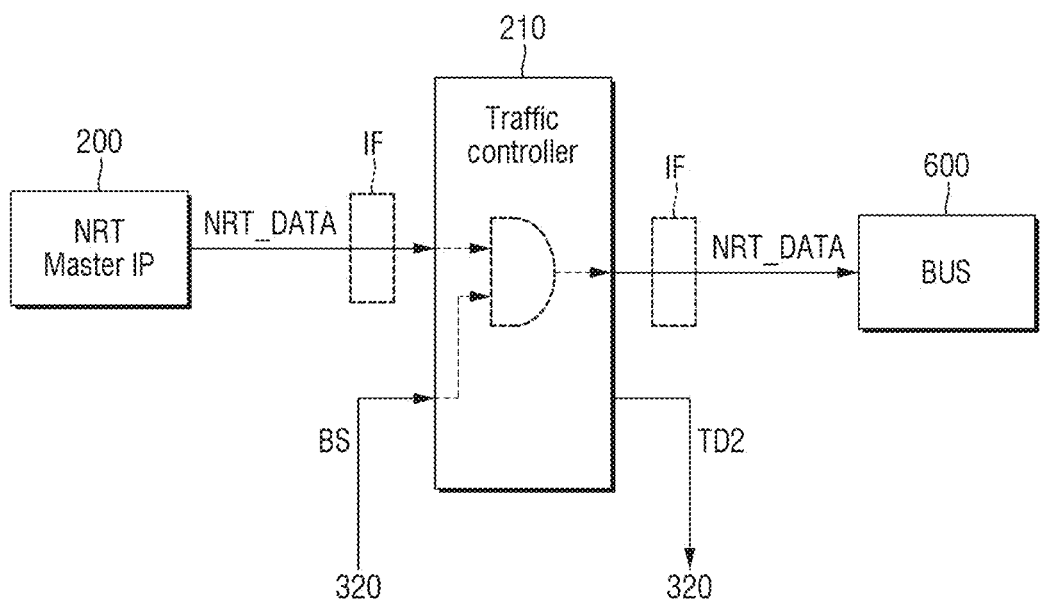

FIG. 1 is a block diagram for illustrating an electronic device including a system on chip according to some example embodiments of the inventive concepts. FIG. 2 is a diagram for illustrating a memory controller according to some example embodiments of the inventive concepts. FIG. 3 and FIG. 4 are diagrams for illustrating a traffic controller according to some example embodiments of the inventive concepts.

Referring to FIG. 1 to FIG. 4, an electronic device 1 includes a system on chip 10, a memory 30, and/or a storage device 40, etc., but the example embodiments are not limited thereto. Although not shown in the drawing, the electronic device 1 may include a liquid crystal display, a touch panel, a security block, and the like. Further, it will be understood that components of the electronic device 1 are not limited to the illustrated components.

The electronic device 1 may include a mobile station, a fixed and/or mobile subscriber station, a pager, a cellular phone, a personal digital assistant (PDA), a smart phone, a laptop, a netbook, a personal computer, and/or a wireless sensor, etc.

The system on chip 10 may be manufactured into one chip, and may act as an application processor according to at least one example embodiment, but is not limited thereto.

The system on chip 10 may execute various applications (e.g., apps, software, programs, operations, etc.) in response to a user's request. The system on chip 10 loads and executes the at least one application in the memory 30. The system on chip 10 may operate an operating system OS, and execute various applications on the operating system, etc. For this purpose, the system on chip 10 may write data to the memory 30 and/or read data stored in the memory 30, etc.

The system on chip 10 (e.g., processing circuitry, etc.) includes a real-time master intellectual property (IP) 100 (e.g., real-time master IP core, real-time master IP block, etc.), a first traffic controller 110, a non-real-time time master IP 200 (e.g., non-real-time master IP core, non-real-time master IP block, etc.), a second traffic controller 210, a memory controller 300, at least one storage interface 400, at least one processor 500 and/or at least one bus 600, etc., but the example embodiments are not limited thereto, and for example, the system on chip 10 may include a greater or lesser number of constituent components, two or more of the components may be combined, etc. According to some example embodiments, the real-time master IP 100, first traffic controller 110, non-real-time time master IP 200, second traffic controller 210, memory controller 300, at least one storage interface 400, at least one processor 500 and/or at least one bus 600, etc., may be implemented as processing circuitry of the system on chip 10. The processing circuitry may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, an application-specific integrated circuit (ASIC), etc.

The real-time master intellectual property 100 processes input and/or generated data into real-time data RT_DATA and/or transmits the latter within a desired and/or specific time duration. The real-time data RT_DATA refers to any digital and/or analog information processed by the real-time master intellectual property 100. A time duration for which data is input thereto and/or is generated therein and then has been processed and/or transmitted is known as latency.

A desired and/or maximum allowable latency in the real-time master intellectual property 100 may be dependent on an application which the system on chip 10 executes. Applications in which the latency requirement is strict may be referred to as "hard" real-time applications, while applications in which the latency requirement is not strict (e.g., do not have latency requirements, etc.) may be referred to as "soft" real-time applications. The soft real-time applications often desire and/or require satisfying an application-dependent, usually subjective, "fast enough" latency, but the example embodiments are not limited thereto.

Accordingly, for example, the real-time master intellectual property 100 may act as a display IP that desires and/or requires compliance with a latency constraint. However, the technical spirit of the example embodiments of the inventive concepts are not limited to the example. Further, although a single real-time master intellectual property 100 is illustrated, this may be intended for convenience of description. The real-time master intellectual property 100 may include a plurality of real-time master intellectual properties, etc. Additionally, each of the real-time master intellectual properties 100 may operate independently, but are not limited thereto.

The real-time master intellectual property 100 provides the real-time data RT_DATA to the memory controller 300 via the first traffic controller 110 and/or the bus 600, etc., but the example embodiments are not limited thereto.

The first traffic controller 110 acts as a relay connecting the real-time master intellectual property 100 and the bus 600 to each other, but is not limited thereto, and for example, may connect to other components as well. More specifically, the real-time data RT_DATA may be delivered to the first traffic controller 110 and/or the bus 600 via an interface (IF) including a bus protocol, etc.

The first traffic controller 110 may monitor the traffic flow (e.g., the transmission) of the real-time data RT_DATA being delivered to the memory 30, and may output first traffic data TD1 about (e.g., regarding, corresponding to, etc.) the traffic flow of the real-time data RT_DATA, etc. For example, the first traffic data TD1 includes bandwidth information about the real-time data RT_DATA, but the example embodiments of the inventive concepts are not limited thereto.

The non-real-time master intellectual property 200 processes input and/or generated data into non-real-time data NRT_DATA and/or transmits the latter without the latency constraint, etc., but the example embodiments are not limited thereto. The non-real-time data NRT_DATA refers to any digital and/or analog information processed by the non-real-time master intellectual property 200, etc. In general, the non-real-time master intellectual property 200 may have a larger output bandwidth than the real-time master intellectual property 100 has, but the example embodiments are not limited thereto.

Accordingly, the non-real-time master intellectual property 200 may act as, for example, a GPU (Graphic Processor Unit) input/output interface that does not require compliance with latency constraints, etc. However, the technical spirit of the example embodiments of the inventive concepts are not limited to the example. Further, although a single non-real-time master intellectual property 200 is illustrated, the example embodiments are not limited thereto, and for example, the non-real-time master intellectual property 200 may include a plurality of the non-real-time master intellectual properties 200, etc. Additionally, each of the non-real-time master intellectual properties 200 may operate independently, but the example embodiments are not limited thereto.

The non-real-time master intellectual property 200 provides the non-real-time data NRT_DATA to the memory controller 300 via the second traffic controller 210 and/or the bus 600, etc., but the example embodiments are not limited thereto.

The second traffic controller 210 acts a relay between the non-real-time master intellectual property 200 and the bus 600, etc., but is not limited thereto, and for example, may be connected to additional components, etc. More specifically, the non-real-time data NRT_DATA may be transmitted to the second traffic controller 210 and/or the bus 600 via an interface (IF) including a bus protocol.

The second traffic controller 210 monitors traffic flow of the non-real-time data NRT_DATA being delivered to the memory 30, and may output second traffic data TD2 about the traffic flow of the non-real-time data NRT_DATA. The second traffic data TD2 may include bandwidth information about the non-real-time data NRT_DATA, etc., but the example embodiments of the inventive concepts are not limited thereto.

In addition, the second traffic controller 210 may receive a blocking signal BS from a buffer controller 320 to be described later, and may block the traffic of the non-real-time data NRT_DATA based on the blocking signal BS, but is not limited thereto.

The memory controller 300 provides interfacing between the memory 30 and the system on chip 10. The memory controller 300 may access the memory 30 as requested from the processor 500 and/or other intellectual properties (e.g., IP cores, IP blocks, etc.), etc., but the example embodiments are not limited thereto. For example, the memory controller 300 may write access data DATA_AC to the memory 30 according to and/or based on a write request from the processor 500, etc., but is not limited thereto. Additionally, in response to a read request from the processor 500, the memory controller 300 may read the access data DATA_AC from the memory 30 and transmit data DATA to the processor 500 and/or the storage interface 400, etc., via the bus 600, but the example embodiments are not limited thereto, and for example, the memory controller 300 may transmit the data DATA to an external destination (not shown), etc.

The memory controller 300 may include a buffer 310 and/or the buffer controller 320, etc., but is not limited thereto. The buffer 310 stores therein the data DATA and includes at least one storage region SR including a plurality of queues Q_1 to Q_N, each having a desired and/or certain queue size Q. The certain queue size Q may be desired and/or predefined by the user.

At least some of the plurality of queues Q_1 to Q_N are reserved as a dedicated region to the real-time data RT_DATA by a reservation unit 322 to be described later, but the example embodiments are not limited thereto.

The buffer controller 320 includes a queue calculator 321, the reservation unit 322, and/or a blocking unit 324, etc., but the example embodiments are not limited thereto. The queue calculator 321 (e.g., queue calculator device, queue calculator circuitry, queue calculator processing circuitry, etc.) outputs a reserved queue number N_RT based on the first traffic data TD1, but is not limited thereto. When the input first traffic data TD1 is changed, the queue calculator 321 outputs a changed reserved queue number N_RT, but is not limited thereto.

The reservation unit 322 (e.g., a reservation device, reservation circuitry, reservation processing circuitry, etc.) reserves at least some of the plurality of queues Q_1 to Q_N as a dedicated region for accessing the real-time data RT_DATA, based on the reserved queue number N_RT and a stored reservation table 323. Accordingly, the real-time data RT_DATA may be provided to the memory 30 via the dedicated region, or in other words, the real-time data RT_DATA is stored in the dedicated region of the buffer 310. The non-real-time data NRT_DATA may be provided to the memory 30 via some of the storage region SR except for the dedicated region, or in other words, the non-real-time data NRT_DATA is stored in the non-dedicated region of the buffer 310.

The blocking unit 324 (e.g., a blocking device, blocking circuitry, blocking processing circuitry, etc.) receives residue queue data RD about a residue queue waiting to used (e.g., the queue is inactive, the queue is not in use, etc.), the residue queue being a queue of the plurality of queues which is not a queue contained in the dedicated region and/or a queue under use in the buffer 310, etc., but is not limited thereto. When the residue queue data RD indicates that there is no residue queue waiting to be used, the blocking unit 324 provides the blocking signal BS to the second traffic controller 210, and does not provide the blocking signal BS to the first traffic controller 110 (or in other words, the transmission of the first data (e.g., the first data traffic) is maintained and/or enabled, etc.), but the example embodiments are not limited thereto. Accordingly, according to some example embodiments of the inventive concepts, the traffic of the non-real-time data NRT_DATA is blocked based on the blocking signal BS.

The application and/or the operating system (OS) will be loaded into the memory 30 during a booting time (e.g., during a boot-up process and/or boot-up period, etc.). For example, when the electronic device 1 is booted, an OS image stored in the storage device 40 is loaded into the memory 30 according to and/or based on a booting sequence. All input/output operations of the electronic device 1 may be supported by the operating system OS. Similarly, an application as selected by the user and/or to provide a basic service may be loaded into the memory 30. The memory 30 may be used as a buffer memory to store therein image data provided from an image sensor, such as a camera, etc., but is not limited thereto. The memory 30 may include a volatile memory such as an SRAM (static random access memory) and/or a DRAM (dynamic random access memory), etc., and/or a nonvolatile memory such as a PRAM, MRAM, ReRAM, FRAM, and/or a NOR flash memory, etc., but the example embodiments are not limited thereto.

The storage interface 400 accesses the storage device 40 in response to a request from, for example, the processor 500, but is not limited thereto, and the storage interface 400 may receive requests from other components of the system on chip 10, the electronic device 1, and/or external devices, etc. That is, the storage interface 400 provides an interface between the system on chip 10 and the storage device 40, etc. For example, data processed by the processor 500 is stored in the storage device 40 via the storage interface 400, but the example embodiments are not limited thereto. In another example, data stored in the storage device 40 may be provided to the processor 500 via the storage interface 400, etc.

The storage device 40 may act as a storage medium (e.g., a non-transitory storage medium, etc.) of the electronic device 1. The storage device 40 may store therein, for example, user data, applications, OS images, and/or the like. The storage device 40 may be embodied as a memory card (e.g., MMC, eMMC, SD, MicroSD, etc.), but is not limited thereto, and for example, may be embodied as a hard disk, etc. The storage device 40 may include a NAND-type flash memory having a large storage capacity, etc. Additionally, the storage device 40 may include a next-generation non-volatile memory such as PRAM, MRAM, ReRAM, and FRAM, and/or the NOR flash memory, etc. In another example embodiment of the inventive concepts, the storage device 40 may be embodied as an internal memory provided inside the system on chip 10, but the example embodiments are not limited thereto, and for example, the storage device 40 may be an external storage device, a network storage device, etc. Additionally, according to some example embodiments, there may be a plurality of storage devices 40, etc.

The processor 500 executes software (e.g., the application, the operating system, and device drivers, etc.) selected to be executed in the electronic device 1, but is not limited thereto. For example, the processor 500 will execute the operating system OS loaded into the memory 30, etc. The processor 500 will execute various application programs to operate based on the operating system OS. The processor 500 may include a multi-core processor, and may be embodied as a homogeneous multi-core processor and/or a heterogeneous multi-core processor, but is not limited thereto, and for example, may be a multi-processor, a distributed processing system, etc.

The bus 600 is a system bus for providing an on-chip network inside the system on chip 10, etc. The bus 600 may include, for example, a data bus, an address bus and/or a control bus, etc. The data bus refers to a path along which data flows between components of the system on chip 10 and/or the electronic device 1, etc. Usually, the data bus may provide a memory access path to either the memory 30 and/or the storage device 40, but is not limited thereto. The address bus provides an address exchange path between intellectual properties (IP), etc., but is not limited thereto. The control bus provides a path for delivering a control signal between intellectual properties (IP), etc., but is no limited thereto. However, although a configuration of the bus 600 in the above description is shown such that the bus is separate from the traffic controller, the bus 600 may include the traffic controller in still another example embodiment of the inventive concepts.

Figure 5:
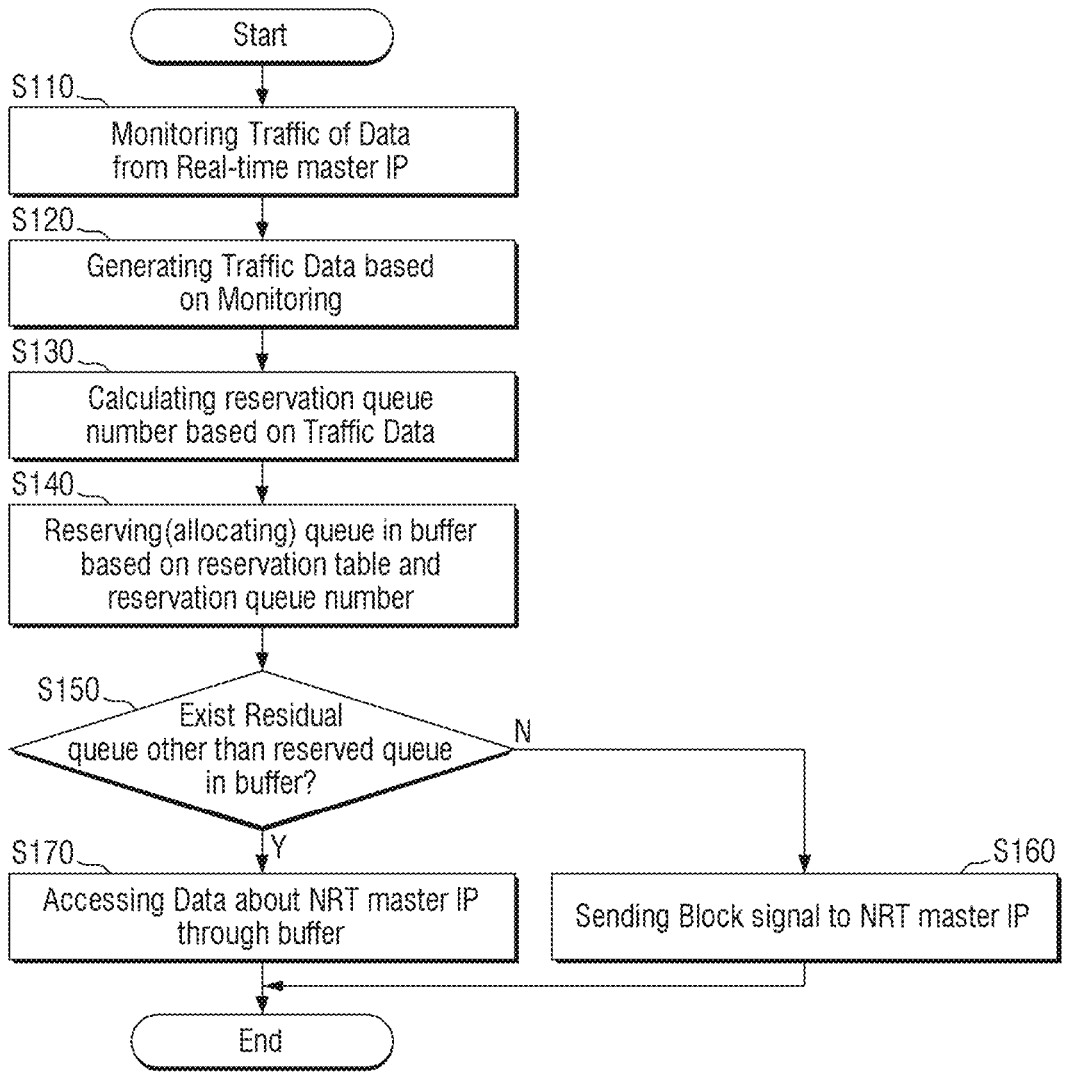
FIG. 5 is a flowchart for illustrating a method for operating a system on a chip according to some example embodiments of the inventive concepts.

FIG. 5 is a flowchart for illustrating a method for operating a system on a chip according to some example embodiments of the inventive concepts. FIG. 6 to FIG. 11 are diagrams for illustrating one or more methods for operating a system on chip according to some example embodiments of the inventive concepts.

Referring to FIG. 5, the first traffic controller 110 monitors the traffic of the real-time data RT_DATA output from the real-time master intellectual property 100 in operation S110.

The first traffic controller 110 generates the first traffic data TD1 about, related to, corresponding to, and/or based on the real-time data RT_DATA based on the monitoring result in operation S120.

Figure 6:
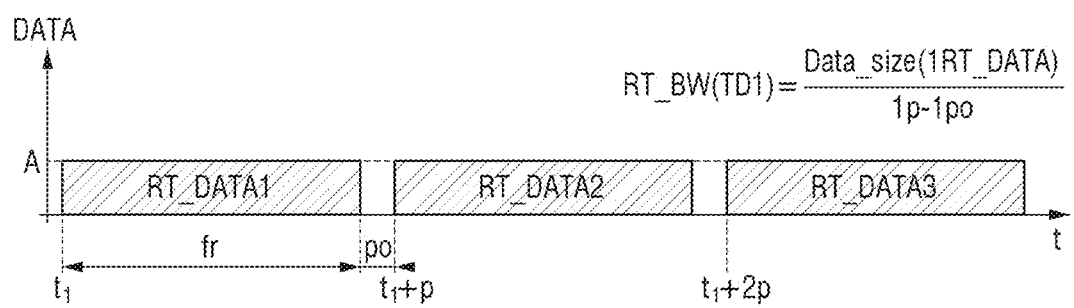

FIG. 6 is a diagram for illustrating the traffic monitoring and the generating of the first traffic data TD1 by the first traffic controller 110 on an assumption that the real-time master intellectual property 100 acts as the display IP, however the example embodiments are not limited thereto.

Referring additionally to FIG. 6, the real-time data RT_DATA includes a plurality of frame data, e.g., first to third frame data RT_DATA1 to RT_DATA3, etc., that are sequentially output in a plurality of time periods, e.g., starting with a first period p from a first time t1, but the example embodiments are not limited thereto. Therefore, the first to third frame data RT_DATA1 to RT_DATA3 are output by a constant spacing of a first porch po.

According to at least one example embodiment, the first frame data RT_DATA1 is isochronous, has a first bandwidth size A, and is output for a frame interval fr from the first time t1, but is not limited thereto.

The real-time master intellectual property 100 may monitor the real-time data RT_DATA and output a real-time bandwidth RT_BW as expressed by the following Mathematical Relationship 1:

RT_BW(TD1)=Data_size(1RT_
DATA)/(1p−1po)                    [Mathematical Relationship 1]

where the RT_BW denotes the real-time bandwidth RT_BW of the real-time data RT_DATA; 1RT_DATA denotes one frame data among the plurality of frame data, e.g., first to third frame data RT_DATA1 to RT_DATA3, etc.; 1p denotes a time size of the first period p; and 1po denotes a time size of the first porch po.

The real-time bandwidth RT_BW of the real-time data RT_DATA in FIG. 6 may be equal to the first bandwidth size A, but is not limited thereto.

Then, the real-time master intellectual property 100 generates the first traffic data TD1 including the real-time bandwidth RT_BW information and provides the first traffic data TD1 to the buffer controller 320.

Figure 7:
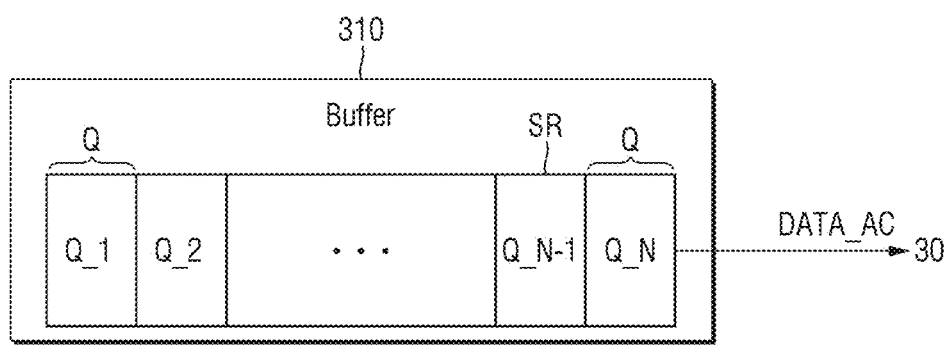

Referring additionally to FIG. 7, the queue calculator 321 calculates the reserved queue number N_RT based on the first traffic data TD1 in operation S130.

The queue calculator 321 calculates the reserved queue number N_RT that satisfies the following Mathematical Relationships 2 and 3, based on a throughput of the access data DATA_AC to the real-time data RT_DATA and the latency:

$$\text{Throughput (DATA\_AC)} = \\ \text{N\_RT} * \frac{\text{Data\_size}(1Q)}{\text{Latency}(\text{DATA\_AC})} < \text{RT\_BW}$$
[Mathematical Relationship (2)]

$$N\_RT \leq N$$
[Mathematical Relationship (3)]

where the RT_BW denotes the real-time bandwidth RT_BW of the real-time data RT_DATA; N denotes the number of the plurality of queues Q_1 to Q_N; 1Q denotes one queue among the plurality of queues Q_1 to Q_N; and DATA_AC denotes the access data DATA_AC to the real time data RT_DATA. Although not shown, information on the latency may be obtained based on a desired and/or minimum latency value and a driving frequency of the buffer 310.

According to the Mathematical Relationships 2 and 3, when the real-time bandwidth RT_BW of the real-time data RT_DATA increases (e.g., in response to the real-time bandwidth RT_BW of real-time data RT_DATA increasing), the reserved queue number N_RT may increase. When the real-time bandwidth RT_BW of the real-time data RT_DATA decreases (e.g., in response to the real-time bandwidth RT_BW of real-time data RT_DATA decreasing), the reserved queue number N_RT may decrease.

Referring additionally to FIG. 8, the reservation unit 322 reserves at least some of the plurality of queues Q_1 to Q_N in the buffer 310 as the dedicated region for accessing the real-time data RT_DATA, based on the reserved queue number N_RT and the reservation table 323.

The reservation table 323 includes a plurality of index information corresponding to the number N of the plurality of queues Q_1 to Q_N, but is not limited thereto.

When the index is 1, the reserved queue number N_RT is 1, and thus the reservation table 323 stores therein information of an n-th queue Q_N together therewith (and/or the n-th queue Q_N information is stored in association with the reserved queue number N_RT in the reservation table 323, etc.). When the index is 2, the reserved queue number N_RT is 2 and thus the reservation table 323 stores therein information of (n−1)-th to n-th queues Q_N−1 to Q_N together therewith (and/or the (n−1)-th to n-th queues Q_N−1 to Q_N information is stored in association with the reserved queue number N_RT in the reservation table 323, etc.). When the index is N, the reserved queue number N_RT is N and thus the reservation table 323 stores therein information of the first to n-th queues Q_1 to Q_N together therewith, etc.

Generally, when the index is K (K is smaller than N), the reserved queue number N_RT is K and thus the reservation table 323 stores therein information of (n−k+1)-th to n-th queues Q_N-K−1 to Q_N together therewith, etc.

Figure 9:
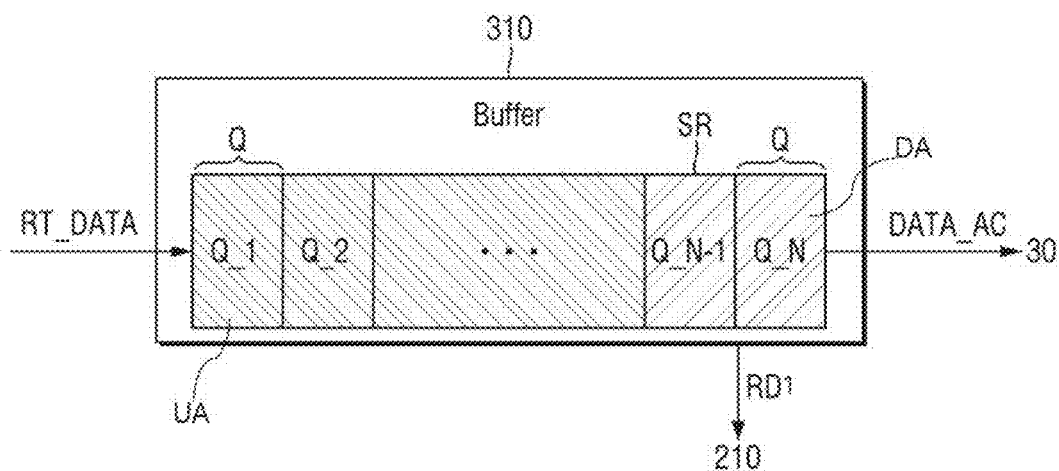
Figure 10:
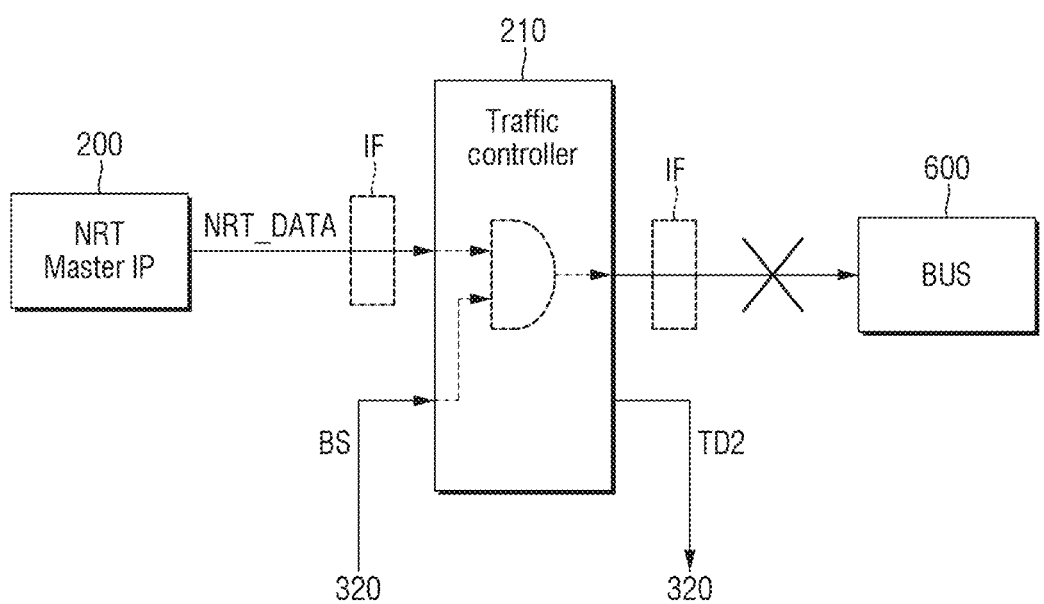

Referring additionally to FIG. 9 and FIG. 10, when there is no residue queue waiting for being used (e.g., in response to there being no residue queue waiting to be used, etc.) other than the reserved queue in the buffer 310 (e.g., N in operation S150), the buffer controller 320 provides the blocking signal BS to the second traffic controller 210 in operation S160.

FIG. 9 and FIG. 10 are diagrams for illustrating the operations of the buffer controller 320 and the second traffic controller 210 on an assumption that the reserved queue number N_RT is 2 and there is no residue queue, however the example embodiments are not limited thereto.

When the reserved queue number N_RT is 2 and there is no residue queue, the (n−1)-th to n-th queues may be reserved as the dedicated region DA, and the remaining first to (n−2)-th queues Q_1 to Q_N−2 acts as a used region UA that is used and/or already under use for processing the non-real-time data, etc., but the example embodiments are not limited thereto.

Therefore, the buffer 310 may provide the first residue queue data RD1, including information that the residue queue is absent, etc., to the blocking unit 324. Thus, the blocking unit 324 provides the blocking signal BS only to the second traffic controller 210 and does not provide the blocking signal BS to the first traffic controller 110. Therefore, the traffic of the non-real-time data NRT_DATA may be blocked by the second traffic controller 210 such that the non-real-time data NRT_DATA is not input and/or transmitted to the memory controller 300, etc.

Figure 11:
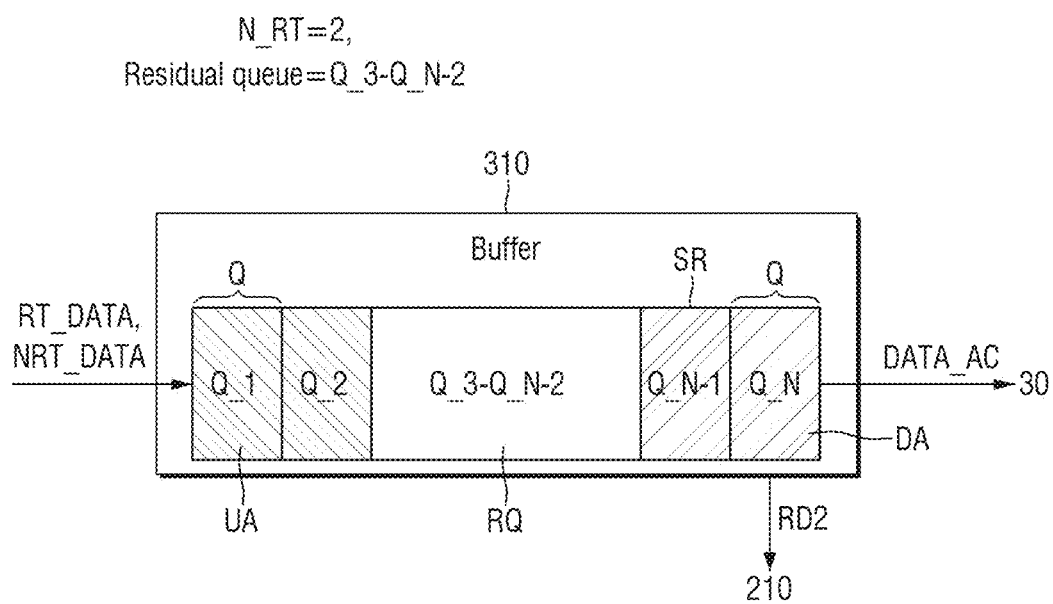

Referring additionally to FIG. 11, when there is (and/or in response to) a residue queue waiting to be used other than the reserved queue in the buffer 310 (the "Y" branch in operation S150), the buffer controller 320 provides the blocking signal BS to the second traffic controller 210 in operation S170.

FIG. 9 and FIG. 10 are diagrams for illustrating the operations of the buffer controller 320 and the second traffic controller 210 on an assumption that the reserved queue number N_RT is 2 and the residue queues are third to (n−2)-th queues Q_3 to Q_N−2 according to some example embodiments, however the example embodiments are not limited thereto.

When (and/or in response to) the reserved queue number N_RT is 2 and the residue queues are the third to (n−2)-th queues Q_3 to Q_N−2, the (n−1)-th to n-th queues may be reserved as the dedicated region DA, and the remaining first to second queues Q_1 to Q_2 are under use for processing the non-real-time data and thus act as a used region UA, but the example embodiments are not limited thereto. Accordingly, the buffer 310 provides the second residue queue data RD2 including information that the residue queues are the third to (n−2)-th queues Q_3 to Q_N−2 to the blocking unit 324, etc.

Accordingly, the traffic of the non-real-time data NRT_DATA is provided by the second traffic controller 210, such that the non-real-time data NRT_DATA together with the real-time data RT_DATA are input to and/or transmitted to the memory controller 300. The inputted non-real-time data NRT_DATA is accessed by the memory 30 using the residue queues, for example, the third to (n−2)-th queues Q_3 to Q_N−2, etc., but the example embodiments are not limited thereto.

In this manner, the system on chip 10 may reserve the dedicated area DA to the real-time master intellectual property 100 in the buffer 310 based on the traffic of the real-time master intellectual property 100, thereby improving the stability of the processing of the real-time data RT_DATA which desires and/or requires compliance with the latency constraint.

Further, in the above manner, the system on chip 10 controls the traffic of the non-real-time master intellectual property 200 based on the identification of the residue queue in the buffer 310, thereby improving the overall performance in data traffic of the system on chip 10.

Figure 12:
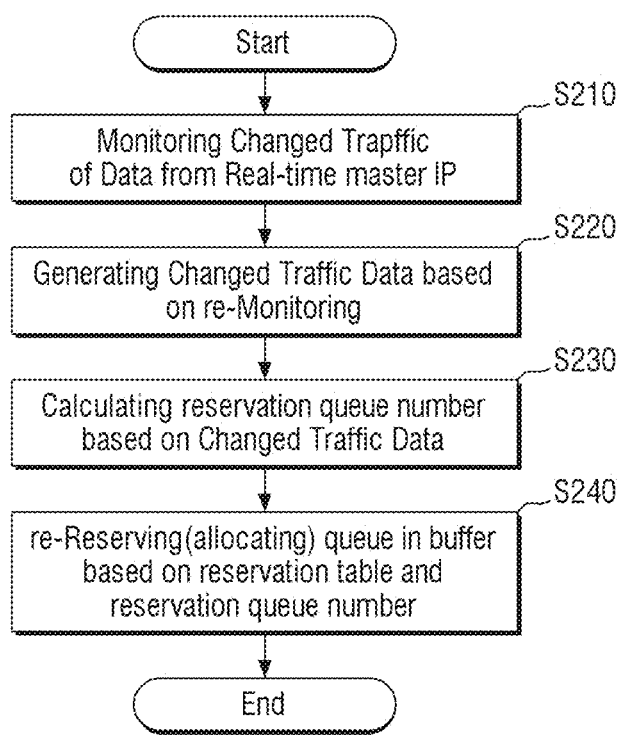
FIG. 12 is a flowchart for illustrating a method for operating a system on chip according to some example embodiments of the inventive concepts.
Figure 13:
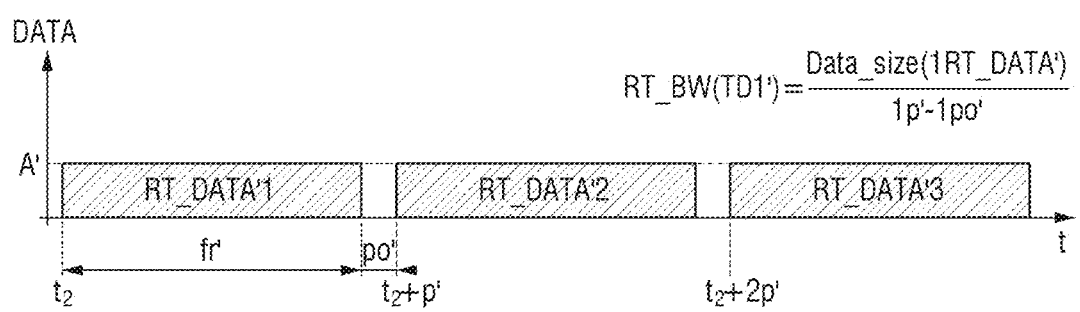
FIG. 13 to FIG. 14 are diagrams for illustrating a method for operating a system on chip according to some example embodiments of the inventive concepts.
Figure 14:
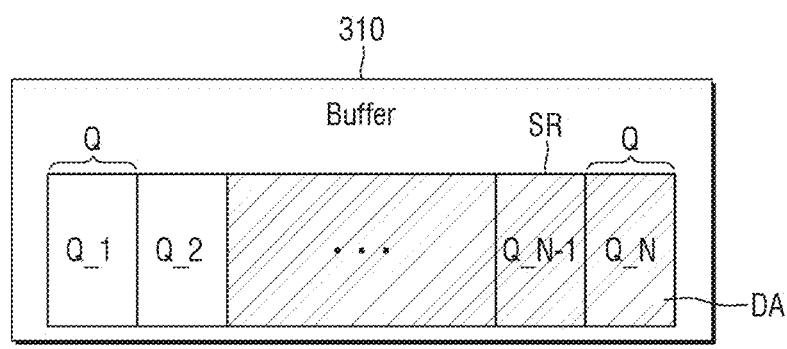

FIG. 12 is a flowchart for illustrating a method for operating a system on chip according to some example embodiments of the inventive concepts. FIG. 13 to FIG. 14 are diagrams for illustrating a method for operating a system on chip according to some example embodiments of the inventive concepts.

Referring to FIG. 12, after operations S110 to S170 in FIG. 5, the first traffic controller 110 monitors the changed traffic of the real-time data RT_DATA output from the real-time master intellectual property 100 in operation S210.

The first traffic controller 110 generates first changed traffic data TD1' about the real-time data RT_DATA based on the monitoring result in S210 in operation S220.

FIG. 13 is a diagram for illustrating the traffic monitoring and the generating of the first changed traffic data TD1' by the first traffic controller 110 after operations S110 to S170 in FIG. 5 on an assumption that the real-time master intellectual property 100 acts as the display IP according to at least one example embodiment, but the example embodiments are not limited thereto.

Referring additionally to FIG. 13, changed real-time data RT_DATA' includes first to third changed frame data RT_DATA1' to RT_DATA3' which are sequentially output in a changed period p' from a second time t2, but is not limited thereto. Therefore, the plurality of frame data, e.g., first to third changed frame data RT_DATA1' to RT_DATA3', are sequentially output by a constant spacing of a changed porch po'.

The first changed frame data RT_DATA1' is isochronous, has a changed bandwidth size A', and is output for a changed frame interval fr' from the second time t2.

The real-time master intellectual property 100 may monitor the changed real-time data RT_DATA' and output a changed real-time bandwidth RT_BW as expressed in the following Mathematical Relationship 4:

$$RT\_BW'(TD1') = \frac{\text{Data\_size}(1RT\_DATA')}{1p' - 1po'} \quad \text{[Mathematical Relationship 4]}$$

where RT_BW' denotes the changed real-time bandwidth RT_BW' of the changed real-time data RT_DATA'; 1RT_DATA' denotes one frame data among the first to third changed frame data RT_DATA1' to RT_DATA3'; 1p' denotes a time size of the changed period p', and 1po' denotes a time size of the changed porch po'.

The changed real-time bandwidth RT_BW' of the changed real-time data RT_DATA' in FIG. 13 may have the changed bandwidth size A', but the example embodiments are not limited thereto.

Then, the real-time master intellectual property 100 generates first changed traffic data TD1' including the changed real-time bandwidth RT_BW' information and provides the first changed traffic data TD1' to the buffer controller 320, but is not limited thereto.

The queue calculator 321 calculates a changed reserved queue number N_RT' based on the first traffic data TD1 in operation S230. A description of operation S230 may be the same and/or similar to the above description of operation S130.

Referring additionally to FIG. 8 and FIG. 14, the reservation unit 322 re-reserves at least some of the plurality of queues Q_1 to Q_N as the dedicated region for accessing the real-time data RT_DATA in the buffer 310, based on the changed reserved queue number N_RT' and the reservation table 323 in operation S240, but the example embodiments are not limited thereto. FIG. 14 is a diagram for illustrating the re-reservation on an assumption that the changed reserved queue number N_RT' is N−2, but the example embodiments are not limited thereto.

When (and/or in response to) the change reserved queue number N_RT' is N−2, the reservation unit 322 re-reserves the third to n-th queues Q_3 to Q_N as the dedicated region DA for processing the changed real-time data RT_DATA', but is not limited thereto.

Thereafter, operations as described above in operations S150 to S170 may be performed, but the example embodiments are not limited thereto.

In this way, the system on chip 10 may re-reserve the dedicated area DA dynamically based on the traffic of the real-time master intellectual property 100, thereby improving the stability of the processing of the real-time data RT_DATA that desires and/or requires compliance with the latency constraint, and overall performance in data traffic of the system on chip 10.

Figure 15:
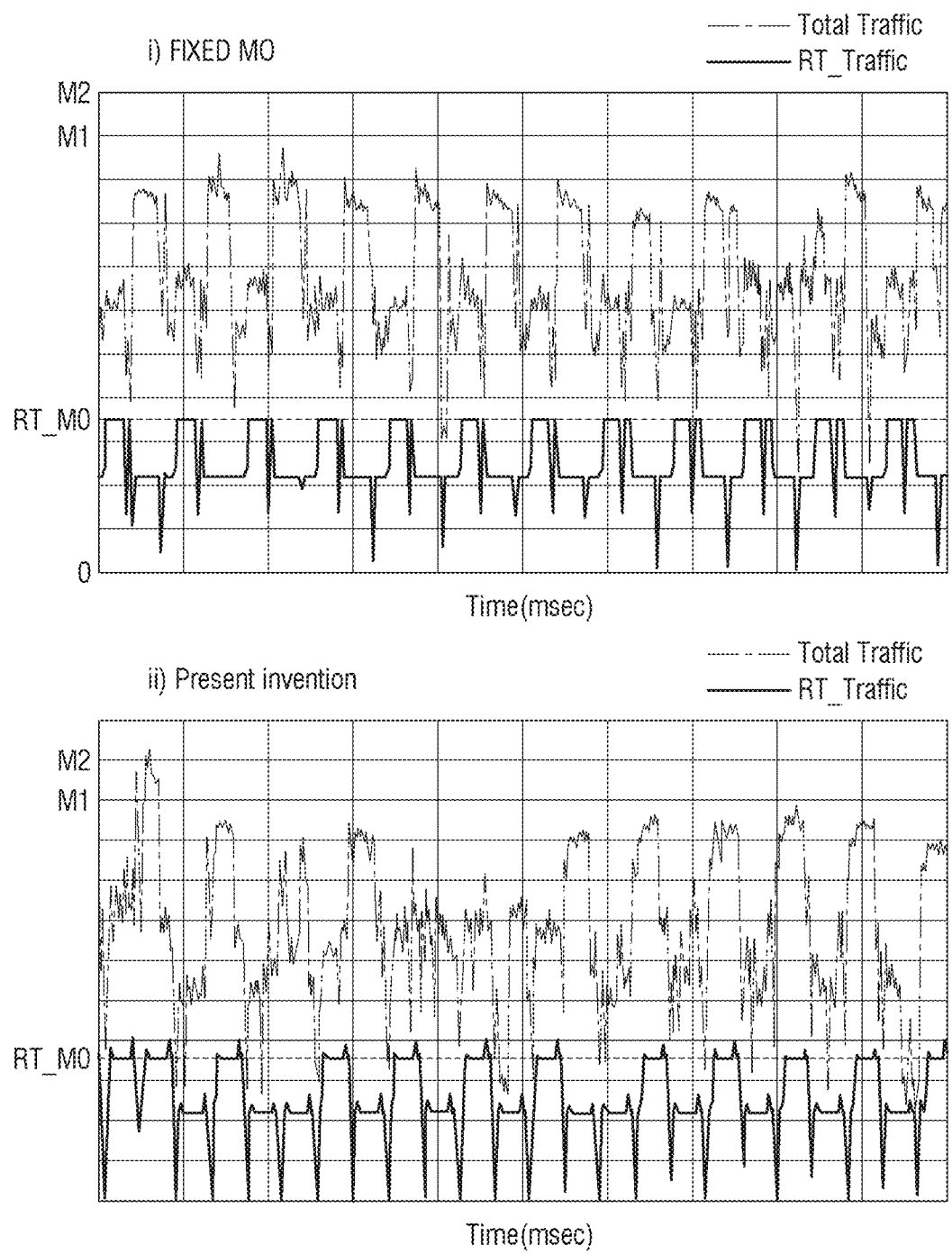
FIG. 15 is a diagram for illustrating effects of a system on chip according to some example embodiments of the inventive concepts.

FIG. 15 is a diagram for illustrating effects of a system on chip according to some example embodiments of the inventive concepts.

In a system on chip FIXED MO that fixedly sets an expected output value of the intellectual property, the bandwidth RT_Traffic of the real-time data does not exceed a desired and/or predefined expected value RT_MO. However, the system on chip 10 according to the inventive concepts dynamically reserves at least some of the plurality of queues in the buffer dynamically based on the traffic of the real-time data, such that the bandwidth RT_Traffic of the real-time data may exceed the desired and/or predefined expected value RT_MO.

Accordingly, in the system on chip FIXED MO that fixedly sets the expected output value of the intellectual property, the bandwidth Total_Traffic of the entire data does not exceed a first threshold value M1. However, in the system on chip 10 according to at least one example embodiment of the inventive concepts, due to the dynamic reservation, the bandwidth Total_Traffic of the entire data may exceed a second threshold value M2 greater than the first threshold value M1, as desired and/or needed.

Using the one or more methods of the example embodiments corresponding to FIGS. 5 to 14, the system on chip 10 according to at least one example embodiment of the inventive concepts may reserve and/or re-reserve the dedicated area DA dynamically based on the traffic of the real-time master intellectual property 100, thereby improving the stability of the processing of the real-time data RT_DATA that desires and/or requires compliance with a desired latency constraint, and therefore improves the overall performance in the data traffic of the system on chip 10.

In concluding the detailed description, those skilled in the art will appreciate that many variations and modifications may be made to the example embodiments without substantially departing from the principles of the inventive concepts. Therefore, the disclosed example embodiments are used in a generic and descriptive sense only and not for purposes of limitation.

What is claimed is:

1. A system on chip (SoC) comprising:
a plurality of intellectual property (IP) cores including a first IP core configured to process data in real-time;
a buffer including a plurality of queues; and
a real-time traffic controller, the real-time traffic controller configured to,
receive first real-time data output from the first IP core, and
generate first traffic data corresponding to the first real-time data; and
processing circuitry is configured to,
reserve at least one queue of the plurality of queues as a first dedicated area based on the first traffic data, the first dedicated area configured to be used as a queue for transmission of the first real-time data.

2. The system on chip of claim 1, wherein the plurality of IP cores further include a second IP core configured to process data in non-real-time.

3. The system on chip of claim 2, further comprising:
a non-real-time traffic controller configured to monitor second non-real-time data output from the second IP core; and
in response to a residue queue being absent from the plurality of queues, the residue queue being a queue which is inactive and is not the first dedicated area, the processing circuitry is further configured to block transmission of the second non-real-time data and continue transmission of the first real-time data.

4. The system on chip of claim 3, wherein in response to the residue queue being present, the processing circuitry is further configured to transmit the second non-real-time data to an external component via the residue queue.

5. The system on chip of claim 2, wherein the second IP core is a graphic processor unit (GPU).

6. The system on chip of claim 1, wherein the first IP core is a display IP core.

7. The system on chip of claim 1, wherein in response to the outputting of the first real-time data, the real-time traffic controller is further configured to:
monitor transmission of third real-time data output from the first IP core, and
generate second traffic data corresponding to the transmission of the third real-time data; and
the processing circuitry is further configured to reserve a second dedicated area from the plurality of queues, the second dedicated area configured to be used as a queue for transmission of the third real-time data based on the second traffic data.

8. The system on chip of claim 7, wherein the processing circuitry is further configured to store a reservation table containing information regarding the first dedicated area, and information regarding the second dedicated area.

9. The system on chip of claim 1, wherein the first traffic data includes bandwidth information corresponding to the first real-time data output from the first IP core.

10. A system on chip (SoC) comprising:
a plurality of intellectual property (IP) cores, the plurality of IP cores including a first IP core and a second IP core;
a buffer including a plurality of queues; and
processing circuitry configured to,
generate first traffic data corresponding to first data output from the first IP core;
monitor second data output from the second IP core; and
in response to a residue queue being absent from the plurality of queues, the residue queue being a queue which is inactive, the processing circuitry is further configured to block transmission of second data by the second IP core, and
continue transmission of the first data.

11. The system on chip of claim 10, wherein
the first IP core is configured to process the first data in real-time; and
the second IP core is configured to process the second data in non-real-time.

12. The system on chip of claim 11, wherein in response to the residue queue being present, the processing circuitry is further configured to transmit the second data an external component via the residue queue.

13. The system on chip of claim 11, wherein the processing circuitry is further configured to reserve at least one queue of the plurality of queues as a first dedicated area based on the first traffic data, the first dedicated area configured to be used as a queue for transmission of the first data.

14. The system on chip of claim 13, wherein the first traffic data includes information regarding a bandwidth of the first data output from the first IP core.

15. The system on chip of claim 13, wherein
in response to the outputting of the first data, the processing circuitry is further configured to monitor transmission of third data output from the first IP core, and
generate second traffic data corresponding to the transmission of the third data; and
reserve a second dedicated area from the plurality of queues, the second dedicated area configured to be used as a queue for transmission of the third data based on the second traffic data.

16. A method for operating a system on chip, the method comprising:
monitoring, using a real-time traffic controller, transmission of first real-time data output from a first intellectual property (IP) core, wherein the first IP core is configured to process data in real-time;
generating, using the real-time traffic controller, first traffic data corresponding to the first real-time data, based on the monitoring of the first real-time data; and
reserving, using processing circuitry, at least one queue of a plurality of queues in a buffer as a first dedicated area based on the first traffic data, the first dedicated area configured to be used for transmission of the first real-time data.

17. The method of claim 16, wherein the method further comprises:
monitoring, using a non-real-time traffic controller, second non-real-time data output from a second IP core, the second IP core configured to process data in non-real-time; and
controlling, using the processing circuitry, the output of the second non-real-time data.

18. The method of claim 17, wherein the method further comprises:
in response to the plurality of queues not including a residue queue, the residue queue being a which is inactive,
blocking, using the processing circuitry, the transmission of the second non-real-time data, and
continuing transmission, using the processing circuitry, of the first real-time data.

19. The method of claim 16, wherein the method further comprises:
in response to the outputting of the first real-time data, monitoring, using the real-time traffic controller, transmission of third real-time data output from the first IP core;
generating, using the real-time traffic controller, second traffic data corresponding to the third real-time data based on the monitoring of the third real-time data; and
reserving, using the processing circuitry, a second dedicated area from the plurality of queues based on the second traffic data, the second dedicated area configured to be used as a queue for transmission of the third real-time data.

20. The method of claim 19, wherein the reserving the second dedicated area includes updating a reservation table, the reservation table containing information regarding the first dedicated area, and information regarding the second dedicated area.

* * * * *